United States Patent
Fahn et al.

(10) Patent No.: US 8,522,357 B2
(45) Date of Patent: Aug. 27, 2013

(54) RIGHTS-BASED ADVERTISEMENT MANAGEMENT IN PROTECTED MEDIA

(75) Inventors: Paul N. Fahn, Sunnyvale, CA (US); Sanjeev Verma, San Jose, CA (US); Byung-Rae Lee, Seoul (KR)

(73) Assignee: Samsung Electronics, Co., Ltd, Suwon (KR)

( * ) Notice: Subject to any disclaimer, the term of this patent is extended or adjusted under 35 U.S.C. 154(b) by 797 days.

(21) Appl. No.: 12/620,889

(22) Filed: Nov. 18, 2009

(65) Prior Publication Data

US 2010/0325737 A1    Dec. 23, 2010

Related U.S. Application Data

(60) Provisional application No. 61/219,253, filed on Jun. 22, 2009.

(51) Int. Cl.
*G06F 7/04* (2006.01)
*H04L 29/06* (2006.01)
*G06F 17/30* (2006.01)
*H04N 7/16* (2006.01)

(52) U.S. Cl.
USPC .............. 726/27; 726/1; 726/26; 386/251

(58) Field of Classification Search
None
See application file for complete search history.

(56) References Cited

U.S. PATENT DOCUMENTS

| | | | | |
|---|---|---|---|---|
| 7,298,962 | B2 * | 11/2007 | Quan et al. | 386/251 |
| 7,302,160 | B1 * | 11/2007 | Wells | 386/250 |
| 8,005,713 | B1 * | 8/2011 | Sanz-Pastor et al. | 705/14.1 |
| 2001/0055463 | A1 * | 12/2001 | Armengaud | 386/46 |
| 2003/0031455 | A1 * | 2/2003 | Sagar | 386/35 |
| 2003/0233656 | A1 * | 12/2003 | Sie et al. | 725/46 |
| 2004/0045020 | A1 * | 3/2004 | Witt et al. | 725/13 |
| 2004/0133909 | A1 * | 7/2004 | Ma | 725/34 |
| 2006/0218617 | A1 * | 9/2006 | Bradstreet et al. | 725/135 |
| 2009/0031431 | A1 * | 1/2009 | Boccon-Gibod | 726/30 |
| 2009/0204541 | A1 * | 8/2009 | Zhuk et al. | 705/50 |
| 2010/0138868 | A1 * | 6/2010 | Sie et al. | 725/46 |
| 2010/0175079 | A1 * | 7/2010 | Braun et al. | 725/32 |

* cited by examiner

*Primary Examiner* — Nathan Flynn
*Assistant Examiner* — Trang Doan
(74) *Attorney, Agent, or Firm* — Kenneth L. Sherman, Esq; Michael Zarrabian, Esq; Sherman & Zarrabian LLP

(57) ABSTRACT

A user playing a media file having ads on a playback device is able to automatically skip the ads during playback depending on the user's subscription level, as indicated in a user license or user account information. Whether an ad is automatically skipped may depend not only on the user license but also on attributes of the ad. An ad may have a skip-level which indicates the "importance" of the ad. If the advertiser wants to ensure that the ad will be seen and not be automatically skipped by a media playback unit, it can pay a higher price for the ad and the ad will be assigned a higher skip-level value. On the user subscription side, a user who wants to avoid ads may pay a higher subscription fee and have a user license that determines, via an auto-skip level value ("user level"), how many ads the user can automatically skip during playback of the media file. With a higher the auto-skip level value, the user is able to automatically skip more ads on the playback device.

37 Claims, 7 Drawing Sheets

RIGHTS-BASED ADVERTISEMENT MANAGEMENT IN PROTECTED MEDIA

CROSS-REFERENCE TO RELATED APPLICATIONS

This application claims the benefit of U.S. Provisional Patent Application No. 61/219,253, titled "RIGHTS-BASED ADVERTISEMENT MANAGEMENT IN PROTECTED MEDIA", filed Jun. 22, 2009, which is hereby incorporated by reference in its entirety and for all purposes.

BACKGROUND OF THE INVENTION

1. Field of the Invention

The present invention relates generally to media playback systems and software. More specifically, the invention relates to a media playback unit and techniques for managing the playback of ads or other individually identified segments in a media file using a user license.

2. Description of the Related Art

Presently, if a user wants to skip through advertisements, commercials, previews, and the like (called "ads" hereafter, but should be understood to apply to any individually identifiable content segments) while watching a media file on a personal video recorder (PVR or DVR), such as a TV show or movie, they may be able to by physically pressing a button on a remote control to either fast forward through the ads (also referred to as commercials) or skip through the ad, for example, by skipping through in 30 or 60 second intervals. In both cases, the user is inconvenienced because he or she is required to be proactive by manually pressing a button and, while doing so, watch the screen to ensure that the fast forwarding or skipping stops when the actual TV show or movie begins. Additionally, the resulting uncertainty about whether the user has watched an ad hurts the ability of the service provider to correctly set the price of ad placement into the content.

Currently there are ways to identify the location of ads and to mark individual ads with one or more "usage constraints." These include "No-Skip" which prevents the user or viewer from fast-forwarding through ads or from manually skipping ads. For example, the Marlin Specification entitled Dynamic Media Zones (DMZ) describes such methods in an abstract and generic manner. The Marlin DMZ specification describes a mechanism for having types of zones in a media presentation. This specification describes attributes representing constraints that a media player application must obey when playing back the content, such as advertisement zones that must not be skipped, or a warning screen that must be viewed before the rest of the presentation can be viewed. The DMZ specification is based on technology disclosed in Intertrust Technologies, Inc.'s patent application Ser. No. 12/178,543. The Intertrust patent application focuses on forced play of ads on a per-ad rights basis (referred to as "No-Skip"). The absence of forced play only allows the user to manually fast-forward through ads, that is, where a user must press a button or perform some action to bypass the ad. There is no mention or method for software-controlled auto-skipping of ads.

SUMMARY OF THE INVENTION

In one aspect of the invention, a method of playing a media file, often a protected media file, on a media playback device is described. A media file may contain content of a TV show, a movie, a sporting event, or any form of digital content (e.g., an online video) that contains ad content. A playback device may be any device that has adequate storage capability and the ability (software and/or hardware) to playback the media file. Typical playback devices may include PVRs (DVRs), a mobile playback device (e.g., an MP3 player or camcorder), a smart handset device, such as a cell phone, or a desktop, laptop, notebook, netbook, or tablet-style computer.

In one embodiment, a method of playing a media file having at least one ad is described. An auto-skip level value ("user level") may be retrieved from a user license associated with a media file (content), such as a DRM license. The user level may be examined, wherein a first value of the user level value, such as 1, indicates not playing the ad and a second value of the user level value, such as 0, indicates playing the ad. The media file is played on the playback unit according to the user level value, such that not playing the ad is accomplished without user intervention. That is, the ad is skipped automatically without the user having to take any proactive steps.

In one embodiment, the ad may be skipped after comparing a skip-level value associated with the ad and the user level value and finding that the skip-level value is less than the user level value. In another embodiment, the ad may be played when the skip-level value is equal to or greater than the auto-skip value. In another embodiment, ad management data is extracted from the media content file. In yet another embodiment, the media content file is in the MPEG-2 TS format and a program allocation table, a program map table, and an ad management stream are utilized to obtain the skip-level value of each ad.

Another aspect of the present invention is an apparatus for playing a media content file. As noted above, the apparatus may be a DVR, a PVR, an MP3 player, a computer, among other suitable playback devices capable of storing the media file. The apparatus has at least one processor and a network interface component for receiving data from external sources either via a wired or wireless connection. A data storage unit stores various types of data, including the media content file, ad management data (which may have been extracted from the media file), a user license, such as a DRM license, which may include a user level value. Applications stored in the storage unit may include an ad evaluation module which evaluates ads and user levels to determine when to automatically skip an ad and a media content file playback module. The media content file and the ad management data may be received by the apparatus using the network interface component. The playback module and the ad evaluation module execute on the processor, such that during playback of the media content file, ads are automatically skipped depending on the user level value. In one embodiment, the ad management data includes a skip-level value and ads are skipped depending on the skip-level value and the user level value. In another embodiment, the data storage unit stores a program allocation table and a program map table.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Figure 1:
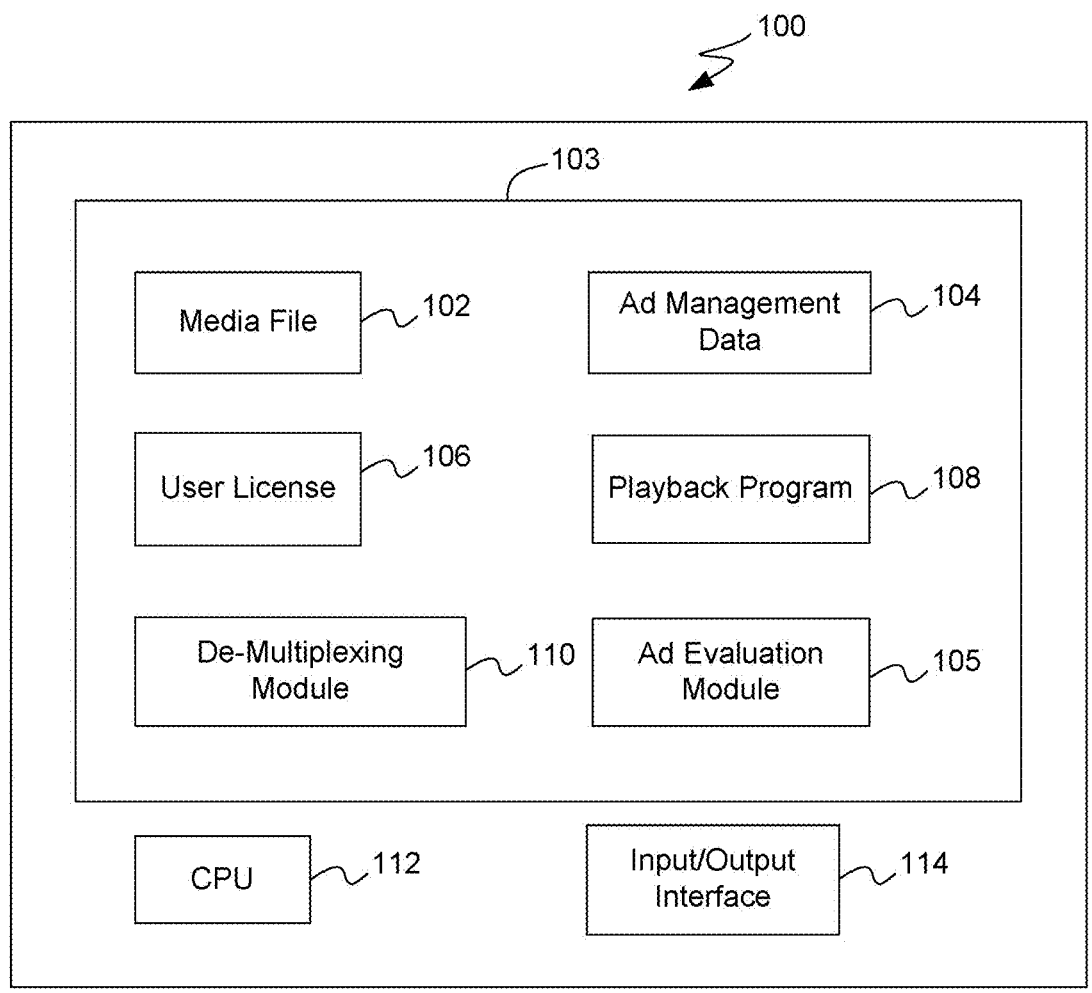
FIG. 1 is a block diagram of various data components stored in a media playback unit that may be needed for implementing automatic ad skipping in accordance with one embodiment.

Methods and apparatus that enable automatic skipping of ads in which a user does not have to take any proactive steps during playback of a media file are described in the various figures. It is becoming increasingly common for consumers or users to download movies, TV shows, sporting events, and other media content from remote sources, including cable TV companies, satellite TV providers, and online content providers. Users can now have all types of media content from various providers streamed or downloaded directly to their playback units. In one scenario, a media file is transmitted over a cable TV line to a media unit at the user's home, such as a personal or digital video recorder (PVR or DVR), and is stored on a mass storage device, typically a hard disk. For example, a user may schedule a recording of a sporting event. When the scheduled time arrives, the event is streamed to the PVR and is recorded onto the hard disk for viewing later. Of course, this may also be done with movies, TV shows, and the like; also, the content may be downloaded rather than streamed.

These media content often have ads before, after, and during the actual event, TV show, or movie. The term "ad" used herein refers not only to conventional paid advertisements, but may also include public service announcements, previews for other content, messages from third parties, and other distinguishable content segments in the media file. The primary content (or simply, content) in the media file is the content that the user is interested in watching (e.g., movie, TV show, sporting event, online content, podcast, etc.) and the ad is a content segment that is distinguishable from the primary content. During playback of the media file, the user sees the ads and in some case may be allowed to fast forward or skip through them by pressing a button on the remote, if desired. In another example, a media file storing a show and associated ads may be downloaded from a Web site onto a computer. During playback of the file, the user will see the ads and may fast forward through them by clicking on the appropriate media control buttons displayed by the playback software on the PC (e.g., Quicktime, Windows Media Player, iTunes, and the like). It is possible for the service provider (the entity that streams the media file to the user) to place usage constraints on certain or all of the ads in the media file, such as not allowing the user to skip or fast forward through an ad. However, in most cases, at least presently, if the user can skip/fast forward through the ad, this must be done manually. The goal of the various embodiments of the present invention is automatic skipping of all or some ads during playback. This provides a superior user experience than manual ad skipping. Having the ad skipping done automatically by the media unit software or hardware is a more enjoyable and convenient user experience than having the user manually press buttons, for example, on a remote control each time an ad appears.

Figures 2A, 2B:
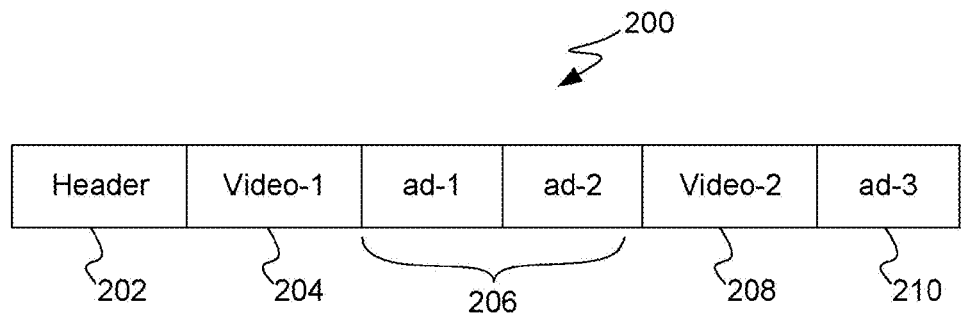
FIG. 2A is a block diagram of a specific format of a media file in accordance with one embodiment.
FIG. 2B is a detailed illustration of various fields in a header of a media file.

FIG. 1 is a block diagram of various data components stored in a media playback unit that may be needed for implementing automatic ad skipping in accordance with one embodiment. A media playback unit 100 has a mass storage component 103, such as a hard disk or solid state memory, which provides persistent storage for a media file. The media file may have been transmitted to media unit 100 over a cable network, via satellite, over the Internet, from another storage device (e.g., DVD or CD), among other sources (not shown). In the described embodiment, a media file 102, having a particular format, is streamed to media unit 100 over a cable TV network (not shown) and stored on storage component 103 in media unit 100 (e.g., a PVR). To illustrate features of the present invention, it is assumed that media file 102 may be any video that contains at least one ad. For illustration, media file 102 may be described as having a portion that is "show" content, such as the actual TV show, movie, sporting event, etc., and "ad" content which will refer to the portions of file 102 that is comprised only of ads. There may be ad content before the show content begins, within the show content or at the end of the show content. Ad content may be only one ad or may consist of multiple ads or ad "blocks" or zones (e.g., four 30-second individual ads comprising a two-minute ad block). Each block or individual ad may be separated by show content. TV shows and movies that are shown on TV networks often have ad blocks before, within, and after the show. FIG. 2A below shows media file 102 in greater detail.

Another data component in media playback unit 100 is ad management data 104 which contains information on the ad content in media file 102. It may include ad numbers, locations, control restrictions, and data related to ad skipping. In one embodiment, ad management data 104 is extracted from media file 102, described below. In another embodiment, data 104 may be transmitted to media unit 100 in a separate file from a service provider, for example, immediately before media file 102 is transmitted. In another embodiment, data 104 is not extracted, but rather is accessed from within media file 102 as needed, in which case box 104 representing ad management data 104 is a logical or abstract representation of the data. In one embodiment, media playback unit 100 also has what may be referred to as an ad evaluation module 105 which examines values relating to user rights to have ads automatically skipped and, in other embodiments, values associated with an ad or span of ads conveying whether the ad may be automatically skipped or if it must be played.

Figure 7:
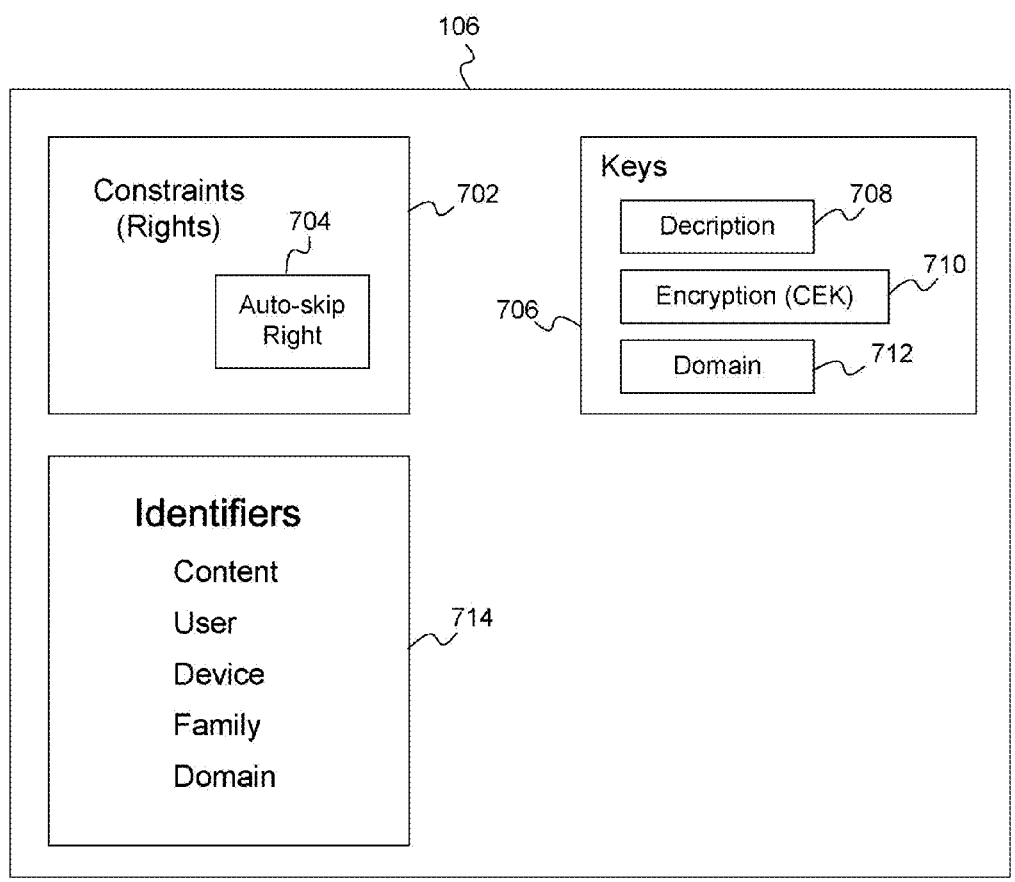
FIG. 7 is a block diagram showing greater detail of a user license in accordance with one embodiment.
Figure 8A:
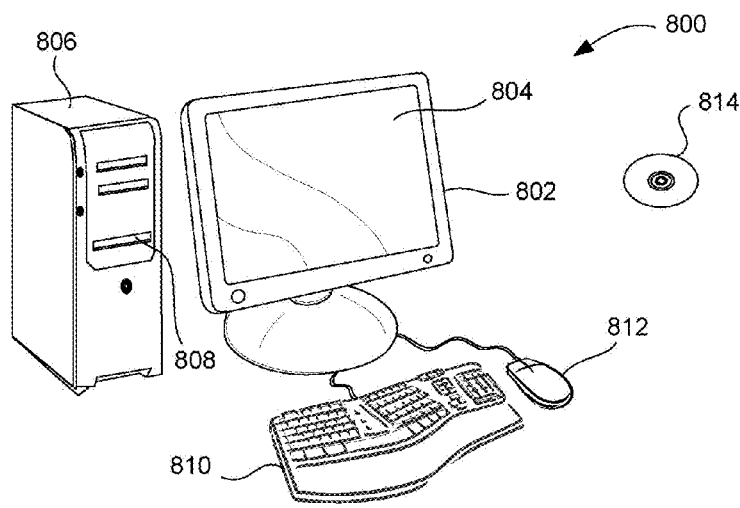
FIGS. 8A and 8B are block diagrams of a media playback unit or similar computing system suitable for implementing various embodiments of the present invention.
Figure 8B:
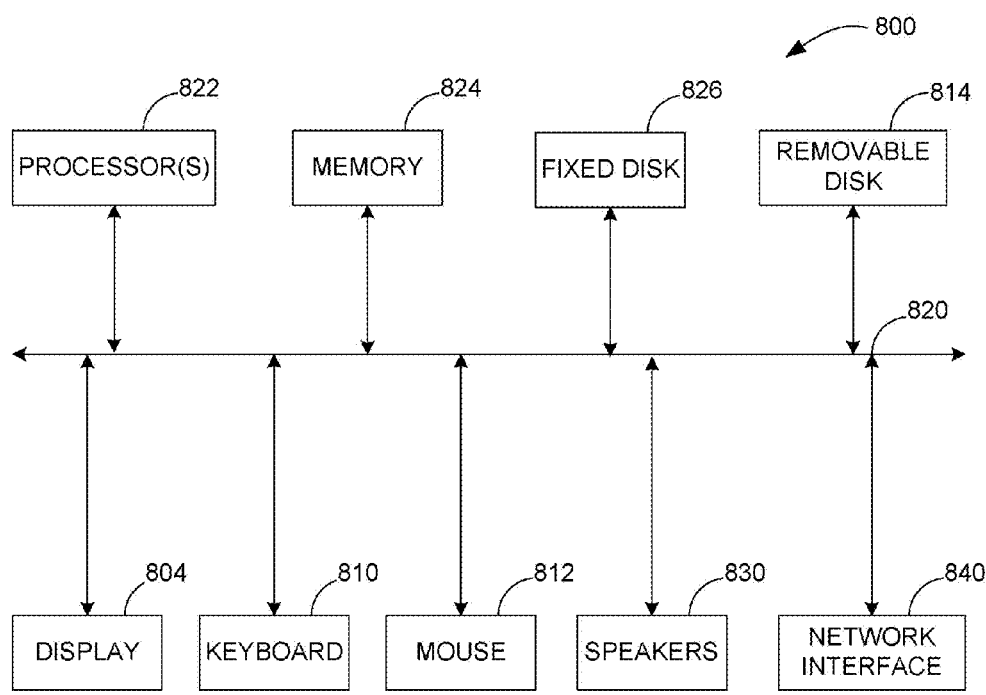

Also shown is a user license 106 which typically resides on media unit 100 before media file 102 is streamed and stored on storage component 103. User license 106 may be a digital rights management (DRM) license that provides information on the user's rights and privileges with respect to viewing one or more media files from a service provider. One embodiment of a DRM license is shown in FIG. 7. As is known in the field, there are various types of DRMs (such as OMA DRM, Marlin, etc.), each DRM specifying a particular format for such licenses. Such licenses are in widespread use in Internet download services and may contain various types of data such as the user's account number, subscription level (dictating the user's rights/constraints with respect to the content) and other data about the user. In one embodiment, it also contains an auto-skip level value which reflects the user's privileges with respect to viewing ads in media file 102. The user right may be channel-based, subscription-based, or by individual program. These privileges and how they are used are described in greater detail below. Finally, media playback unit 100 has software 108 and related hardware (shown in FIGS. 8A and 8B) for playback of media file 102. Program 108 is modified to take into account user ad rights data and skip data associated with each ad in media file 102. Program 108 may be software on a PVR, a TV, a handheld media player, or a computer that executes on a processor (cpu) to enable playback or rendering of media file 102. There may also be a de-multiplexing module 110. Other components and modules, such as processors and network interfaces, of media playback unit 100 are shown in FIGS. 8A and 8B.

FIG. 2A is a block diagram of a specific format of media file 102 in accordance with one embodiment. A video stream 200 of a media file (e.g., a TV show) begins with an encrypted header 202, followed by a first portion of show content 204, referred to as video-1 204, followed by first ad content/block 206, comprised of ad-1 and ad-2, followed by a second portion of show content, video-2 208, and then a single ad-3 210. Header 202 contains various data about the ads in video stream 200.

FIG. 2B is a detailed illustration of various fields in header 202. In one embodiment, header 202 is arranged as a relational database table; however, other formats for storing header ad data may be used. An ad number field 212 contains an ad number for each ad. In this case, the number of rows or entries in header 202 indicates the number of individual ads there are in video stream 200. For example, each ad may be assigned a number starting with 1. A second field 214 may be a starting location of an ad and a third field 216 may be the ending location of the ad. Or there may be a field that contains the length of the ad instead of the ending location. These positions and lengths may be measured in Access Units (AU) or in any other appropriate measurement unit depending on the format used for the file. In one embodiment, header 202 has a skip-level field 218 associated with the specific ad. A skip-level may be a value between 0 and n. This value may be described as reflecting the "importance" or priority of the ad. The use of the skip-level value is described in detail in FIG. 3.

Figure 3:
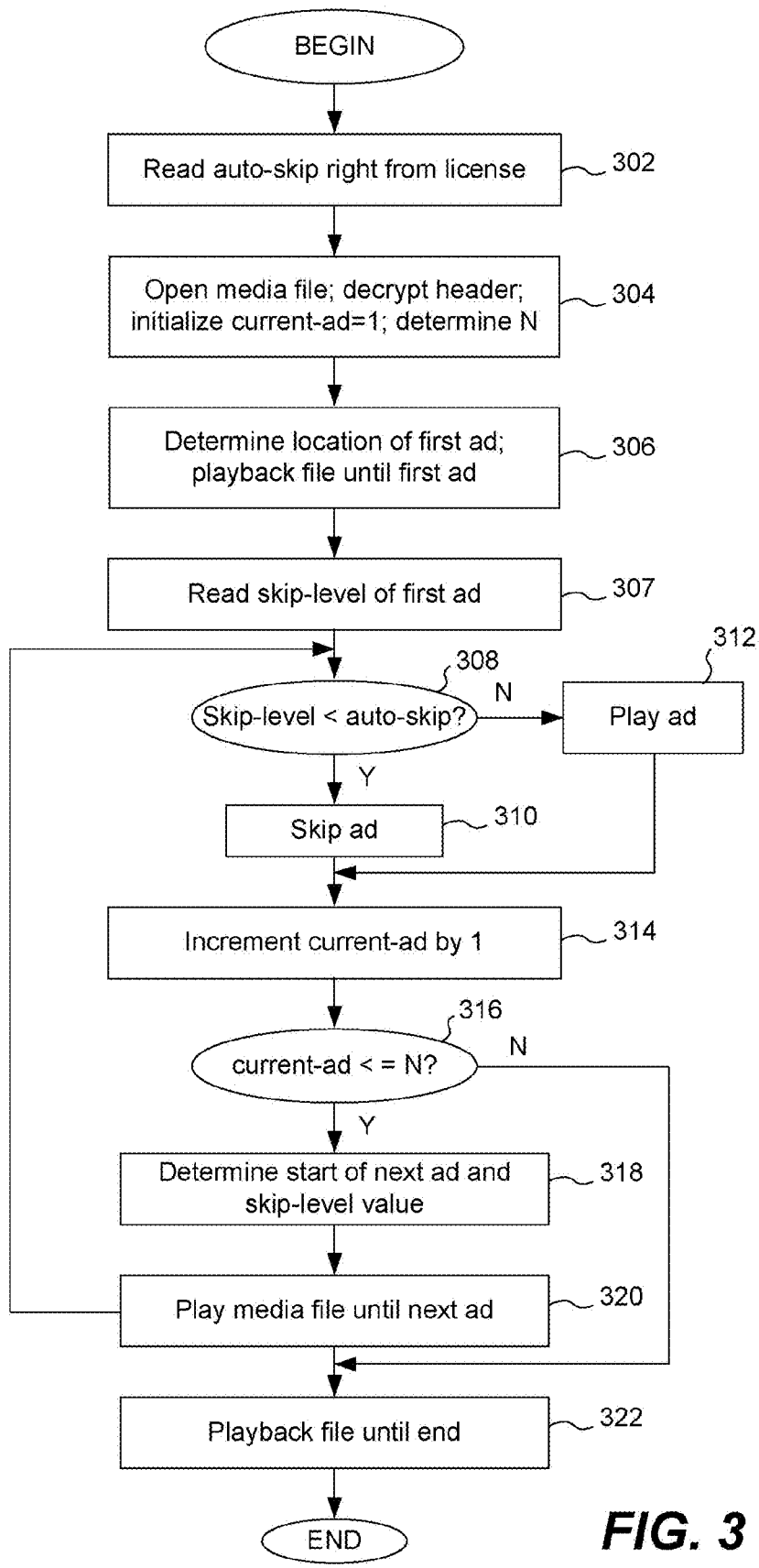
FIG. 3 is a flow diagram of a process for automatically skipping ads in a media file read from memory in a media unit in accordance with one embodiment.

FIG. 3 is a flow diagram of a process for automatically skipping ads in a media file read from memory in a media unit in accordance with one embodiment. At step 302 a media playback program on the media player reads the value of what is referred to in the various embodiments as an auto-skip right value from the user license. As noted, in one embodiment, the user license has a value that indicates a level of "ad-skipping privilege" a user is entitled to, based on subscription level (i.e., subscription price paid) or based on channel or program. This auto-skip right value enables a potential extension in the business model for a service provider. The provider may give a user (consumer) the option to pay more if the user would like to avoid ads in the media files that the user receives from the service provider. For example, if a user pays more for a higher level subscription, the auto-skip right may be higher and the user will see fewer ads (or none) than a user who has a lower subscription level. This auto-skip right value may be stored in any suitable location in the user license. The auto-skip right may also determine if the user can fast forward through the ads and have other data on the user's ad rights. These auto-skip levels also enable the service provider to increase its price discrimination to advertisers; different ads will be either skipped or forcibly viewed by users in various subscription levels.

At step 304 the media playback program opens the media file corresponding to the selection made by the user and decrypts the header. The media file may be read from the unit's hard disk or other mass storage component. Upon opening the media file, the program reads the ad management data which may be in the form of a table or other data structure stored in the header of the media file as described in FIG. 2B; the ad management data may also be stored outside of the media file. In one embodiment, there may be a de-multiplexing component for separating the various streams in the media file. This is described below. The total number of ads in the media may be determined by reading the ad number of the last entry in the table, if the ads are numbered sequentially starting from 1. The media file header may also have a field that stores the total number of ads in the file or the program may count the total number of ads using any efficient method depending on the format of the ad management data. After the total number of ads in the media file has been determined, a variable, current-ad, is set to 1. In other embodiments, step 304 may be performed before 302.

At step 306 the location of the first ad is determined by examining the start location of the first record in the ad management table. At this time the program also begins playback of the media file. The program uses the start location of the first ad to begin playback and continues until the beginning of the first ad. At step 307 the playback program has reached the start location of the first ad and pauses playback to read the skip-level value of the first ad. (The pause is only within the playback control software and is not discernable to the user.) In another embodiment, the program may have read this value when it was reading the start location of the ad. In one embodiment, as noted above, the skip-level value is stored in a skip-level value field in the ad management data table.

At step 308 the skip-level value is compared with the auto-skip level value that was read from the user license at step 302. For this comparison to be logical or meaningful, the units for the auto-skip and skip-level values are the same or are otherwise comparable. In a simplified example, they may both be an integer number between 1 and 10. If the skip-level value of the ad is less than the auto-skip value for the user, control goes to step 310 where the ad is skipped. If the skip-level value is not less than the auto-skip value, the ad is played and additional parameters regarding playback of the ad may be examined at step 312. Thus, at step 308, the program determines whether the user has a sufficiently high auto-skip right value to instruct the playback program to automatically skip the ad. The ad has a skip-level value, which may be described as measuring the priority or importance of the ad. In short, the more an advertiser pays for placing the ad, the higher the skip-level value will be. The advertiser may opt to pay the maximum amount which may give the ad a skip-level value of 10. In this case, the ad may never be skipped because the highest auto-skip value a user can have is 10 (which is not less than 10) and control will go to step 312 where the ad is played (possibly subject to other parameters). If the advertiser pays an intermediate rate, the ad may be assigned a skip-level of 5. If the user has an auto-skip value less than 5, the ad will be skipped, otherwise it will be played. At step 312 the media playback program reads ad control information and renders the ad until the next ad or the media file content begins. Control then goes to step 314 where current-ad is incremented by one.

If control goes to step 310, where the ad is skipped, the program reads the end location of the ad or the length of the ad to determine where (e.g., specific Access Unit) the program should skip to. Once the ad is skipped, the program increments the current-ad counter by 1 at step 314. At step 316 the playback program checks whether the counter is less than or equal to the total number of ads, N, in the media file (determined at step 304). If it is, then at step 318 the program reads the start location of the next ad and its skip-level value. At step 320 the program plays the media file until the location of the next ad. If the start location of the current ad is after some content, then the program resumes playback of the content starting from the end of the last current ad. If the next ad is immediately after the previous ad, the media file is not rendered. Control then returns to step 308 where the skip-level value of the current ad is compared to the auto-skip level of the user (this value may be temporarily stored by the program so it does not have to repeatedly access the user license). Returning to step 316, if it is determined that the value of current-ad is not less than or equal to (i.e., greater than) the total number of ads (indicating that the previous ad that was processed was the last ad), then control goes to step 322 where the media file is played until the end of the file and the process is complete. Thus, using various embodiments of this process, a service provider can enable differentiated services to users based on a subscription level or other factors.

Figures 4, 5:
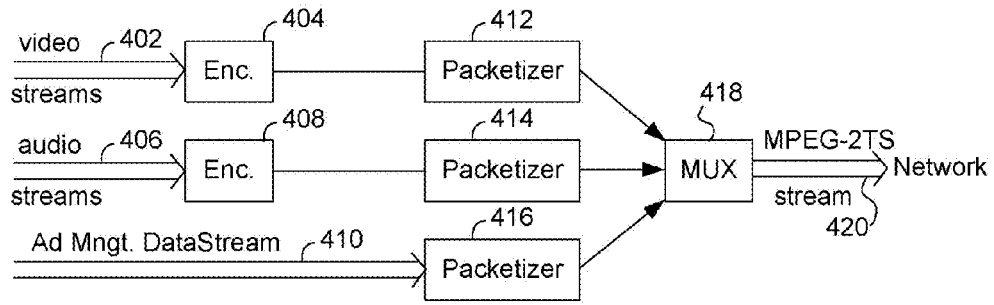
FIG. 4 is a block diagram showing the various streams and how ad management information is multiplexed to create a single MPEG2-TS format stream at a service provider location in accordance with one embodiment.
FIG. 5 is a block diagram showing how an ad management information stream can be de-multiplexed from an MPEG-2 TS stream at a media playback unit in accordance with one embodiment.

As noted above, in one embodiment the media file is transmitted to the user's PVR, computer, or other media playback unit and stored on an appropriate storage device. The media file may be transmitted by a service provider such as a cable TV company or other content provider. The media file that is transmitted to the media unit contains ad management information, in addition to the conventional audio streams and video streams. One format of such a stream is an MPEG2-TS format stream. In the described embodiment, this file format may be extended to store ad management information. FIG. 4 is a block diagram showing the various streams and how ad management information is multiplexed to create a single MPEG2-TS format stream at a service provider location in accordance with one embodiment. MPEG2-TS provides a system level multiplexing scheme for video and audio streams along with other system-level information.

A scheme or mechanism for inserting ad management information into the broadcast stream is described in FIG. 4. In one embodiment, a separate data stream is added to the MPEG2-TS stream to carry ad management information. One or more video streams 402 are input to an MPEG-2 Elementary Encoder 404 and one or more audio streams 406 are input to a second MPEG-2 Elementary Encoder 408. Streams 402 and 406 are typically comprised of multiple streams. An ad management information stream 410 contains the ad information described above in FIG. 2B. In one embodiment it is a single stream and is not input to an encoder. The output streams from encoders 404 and 408 and ad information stream 410 are each input to packetizers 412, 414, and 416, respectively. The output from each packetizer (Packetized Elementary Stream or PES) are input to a Systems Layer Mux unit 418 where the PES streams are combined to create a final MPEG2-TS stream that 420 is transmitted over a cable network (or other suitable network) and received by a user's PVR, computer, or other media playback unit (not shown). The structure and process described in FIG. 4 is specific to the MPEG2-TS standard. In other embodiments, different components and processes may be used to multiplex the ad management information depending on the specific standard. In this manner, a general framework (data structure) to deliver ad management information that can accommodate a wide range of business models and methods is provided. This structure can be a single item that contains information about all ads in the media file (i.e., single program), or may be used to structure individual packets in a stream of such packets. The former is more appropriate for pre-recorded content and the latter may be more suitable for live broadcasts. In other embodiments, ad information may be in an optional field in the PES or extension field in the TS packet.

Ad management information may be stored in a data structure shown in Table 1.

TABLE 1

|  | Length (bits) | Type |
|---|---|---|
| eAd_Control ( ) { | | |
|   nbrOfZones | 8 | uimsbf |
|   for (i = 0; I < nbrOfZones; i++ { | | |
|     StartAUId | 8 | uimsbf |
|     EndAUId | 8 | uimsbf |
|     FP | 1 | bslbf |
|   } | | |
| } | | |

The variables can be described as follows:

nbrOfZones: number of spans of ad content each span bounded by StartAUId and EndAUId;

StartAUId: index (the specific Access Unit) where the span of ad content starts;

EndAUId: index where the span of ad content ends;

FP (Forced Play): information regarding user control of ad; if FP bit is 1 then the user cannot manually skip or fast-forward through the specific ad content span; and Skip-level: a value assigned to a specific ad in the ad content span or a value assigned to all the ads within the ad content span.

Another data item that may be included in the ad management information stream is a coupon provisioning (CP) bit which indicates the possibility of granting coupons for watching content. In general, Access Control bit values may be applicable to a specific AU or to a range of AUs in a given media file or stream. As noted, these control bits determine whether a certain ad in a given media file can be skipped.

FIG. 5 is a block diagram showing how an ad management information stream can be de-multiplexed from an MPEG-2 TS stream at a media playback unit in accordance with one embodiment. A media playback unit receives MPEG-2 TS stream 420 representing a media file (e.g., a TV show or movie) that contains ads which is recorded onto a PVR. The process begins with a user selecting a recorded program. As is currently done, MPEG2-TS stream de-multiplexer component 110 in FIG. 1 filters a program allocation table (PAT) 502 to obtain the program (i.e., content) selected by the user. PAT 502 already resides on media unit. It is manifested to the user as a listing of programs from which the user can select a program. A sample PAT 502 contains a column 504 for programs (pgm1, pgm2, etc.) and a column 506 for a corresponding program identifier (PID). Each program is comprised of multiple streams. The PID of the selected program points to a program map table (PMT) 508 which may have two columns: type and a program identifier (PID). There is one PMT 508 for each program listed in PAT 502. PMT 504 lists each of the individual streams comprising program 2. An ad management stream 512 corresponding to program 2 is filtered from PMT 504. A PID in PMT 504 maps to ad management stream 512 which is comprised of data in the table described in FIG. 2B. Because a conventional MPEG-2 TS stream does not contain ad management information (i.e., ad management stream 512), the step of filtering for this information from PMT 504 was not previously performed.

Figure 6:
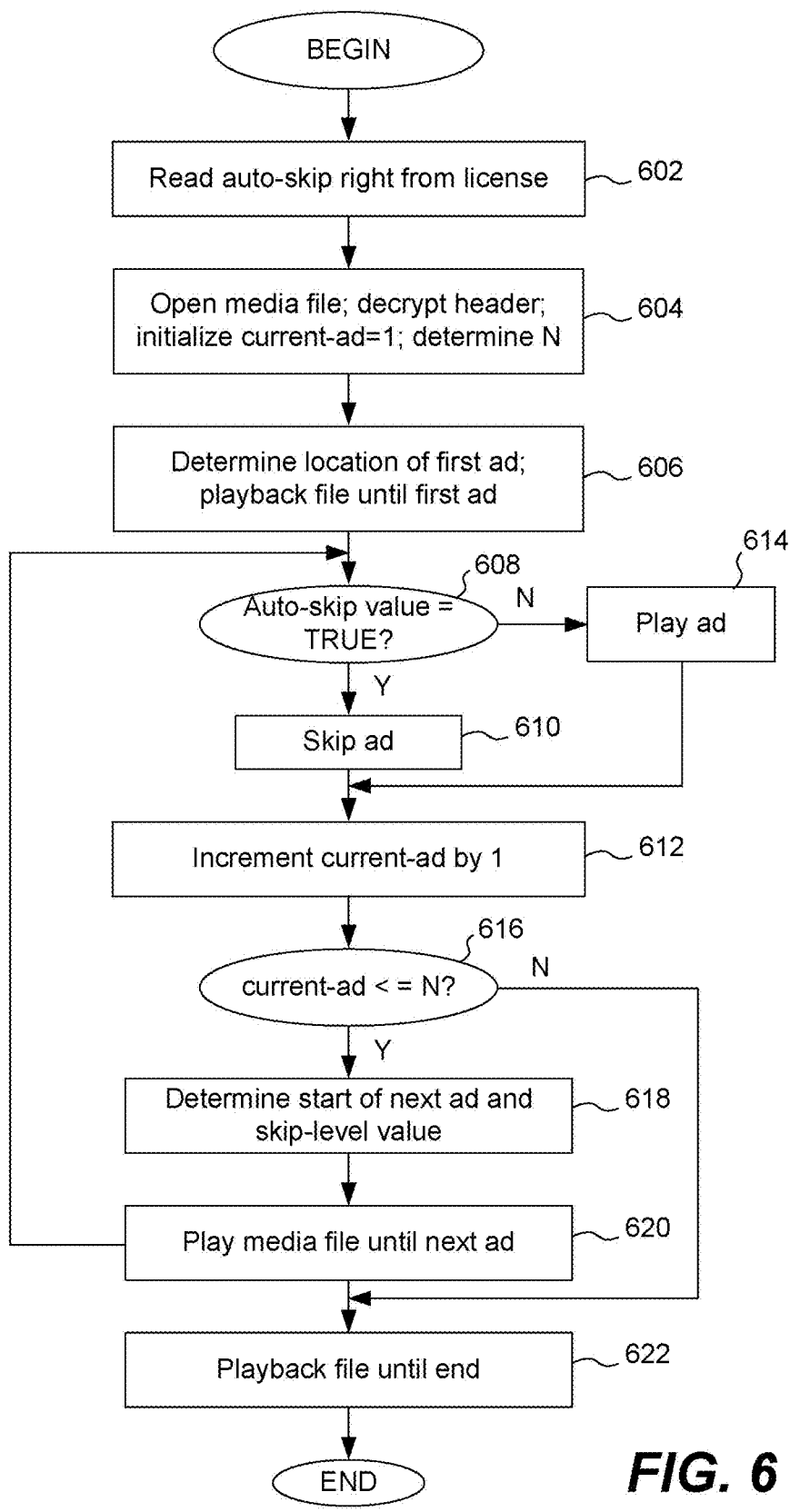
FIG. 6 is a flow diagram of a process of skipping an ad in a media file in accordance with one embodiment.

Returning now to processes for automatically skipping ads, recall that the flow diagram shown in FIG. 3 describes a process in which each ad has a skip-level value stored in the ad management information for the media file. This skip-level value is compared with an auto-skip value assigned to a user, for example, based on a subscription level. In another embodiment, determining whether to skip an ad is based only on an auto-skip right of the user. This embodiment may be described as a binary case or subset of the more general case described in FIG. 3. FIG. 6 is a flow diagram of a process of skipping an ad in a media file in accordance with this embodiment. It is helpful to note that several of the steps are similar to those in FIG. 3.

At step 602 the media playback program on the media player reads the auto-skip right value from the user license. As noted, in one embodiment, the user license stores an auto-skip right value that conveys the level of the "ad-skipping privilege" a user is entitled to, based on subscription level or other factors, such as channel or program. This auto-skip right value may be used to extend the business model for a service provider. The provider may give a user (consumer) the option to pay more if the user would like to avoid ads in the media files the user receives from the service provider. For example, if a user pays more for a higher level subscription, the auto-skip right may be higher and the user will see fewer ads than a user who has a lower subscription level or see no ads. The auto-skip right may also determine if the user can fast forward through the ads and perform other access control operations.

At step 604 the media playback program opens the media file corresponding to the selection made by the user and decrypts the header. The media file may be read from the unit's hard disk or other mass storage component. Upon opening the media file the program reads the ad management data which may be in the form of a table or other data structure stored in the header of the media file, as described in FIG. 2B. The ad management data may also be stored outside of the media file. In one embodiment, there may be a de-multiplexing component for separating the various streams in the media file. The total number of ads in the media may be determined by reading the ad number of the last entry in the table, if the ads are numbered sequentially starting from 1. The media file header may also have a field that stores the total number of ads in the file or the program may count the total number of ads using any efficient method which may be depend on the format of the ad management data. After the total number of ads in the media file has been determined, a variable, current-ad, is set to 1. In other embodiments, step 604 may be performed before 602.

At step 606 the location of the first ad is determined by examining the ad data. Specifically, the start location value of the first record in the table provides this data. At this time the program also begins playback of the media file. The program uses the start location of the first ad to begin playback and continues until the beginning of the first ad.

At step 608 the media playback module determines whether the value of the auto-skip value is TRUE or FALSE (e.g., 1 or 0). If it is TRUE, control goes to step 610 where the ad is skipped automatically by the playback module. The program may read the end location of the ad or the length of the ad to determine where the program should skip to.

Once the ad is skipped, the program increments the current-ad counter by 1 at step 612. If the auto-skip value is FALSE, control goes to step 614 where the ad is played and additional parameters regarding playback of the ad may be examined. Thus, at step 608, the program determines whether the user has the right to have ads automatically skipped by the playback program. At step 614 the media playback program reads ad control information and renders the ad. Control then goes to step 612 where the counter is incremented by 1.

At step 616 the program checks whether the counter is less than or equal to the total number of ads in the media file determined at step 604. If it is, control goes to step 618 where the program reads the start location of the next ad and obtains skip-level value. At step 620 the program plays the media file until the location of the next ad. If the start location of the current ad is after some content (e.g., a movie), then the program resumes playback of the content starting from the end of the last current ad. If at step 616 it is determined that the value of current-ad is greater than the total number of ads, N, then control goes to step 622 where the media file is rendered until the end of the file and the process is complete.

In this embodiment, the ad management information does not contain a skip-level value for each ad since this value is not needed. If a user has an auto-skip level value that is TRUE, then all ads are automatically skipped. There is no prioritization of ads, that is, each ad has the same level of "importance." In another embodiment this value may be part of the ad management information but not used in this specific implementation. If the service provider decides to extend automatic ad skipping service, it may use this value and implement the process described in FIG. 3 or a similar process. In other embodiments, there may be some priority of ads that can be used in conjunction with a user's auto-skip value. The auto-skip value and the skip-level value may both be binary values and binary logic operations may be used to determine whether to automatically skip an ad.

Throughout the description of the various embodiments, reference has been made to a user license or DRM license. A brief description of user license 106 was provided in reference to FIG. 1. FIG. 7 is a block diagram showing greater detail of user license 106 in accordance with one embodiment of the present invention. User license 106 may be in the form of an XML file or other suitable format. User license 106 may have various types of data, some of which is required in all or most licenses and other data which is optional and may be included depending on the needs of content providers, service providers, and users, the nature of the business model, the type of content, the complexity of the constraints and rights involved, among other factors. There are also different types of DRMs, such as OMA DRM and Marlin DRM, among others; each has a different license format. Those of ordinary skill in the field of DRM would be familiar with these licenses and the types of data contained in or conveyed by them, as described below.

The primary data included in nearly all licenses is the constraints placed on an entity (explained below) with respect to viewing and generally handling the content associated with the license. These constraints, which may also be seen as rights the entity has with respect to the content, are shown as data item 702 in FIG. 7. Examples of these constraints (rights) vary widely and may include number of times the entity can view the content, the length of elapsed time the content can be played, or the absolute time until which it can be played. In one embodiment of the present invention, constraints (rights) 702 include auto-skip right 704. This right provides one or more values conveying the right the entity has with respect to automatic skipping of ads in the media file (content) associated with the license. In one embodiment, it may be a 1 or 0. In another embodiment, it may be a value within a specific range. In either embodiment, the value conveys the entity's automatic ad skipping rights, as described in FIGS. 3 and 6. In other embodiments, auto-skip right 704 may be stored at another suitable location in license 106 rather than with constraints (rights) 702.

Another data item that is typically included in license 106 is at least one type of encryption key, shown as keys 706. For example, it may be a decryption key 708 for decrypted the media file (content) that is typically encrypted. License 106 may also contain a content encryption key (CEK) 710 which may be used to encrypt A decryption key. There may also be a domain key 712 which is similar to keys 708 or 710 but is shared among several devices in a domain (distinguished set of devices or users). As someone of ordinary skill in the art knows, there are other types of keys that may be included, each used for a specific purpose, not relevant to the present invention.

Another category of data items that may be included in license 106 is identifiers 714. These identifiers define or may be associated with the term "entity" used in the preceding paragraphs. An entity may be an individual user or family of users, or a device or a domain, such as a set of devices. There may also be one or more identifiers for the content associated with the license. In the specific embodiments described above, "entity" is typically an individual user or a household; thus, a DRM license in the embodiments above may likely have a user ID or service account number corresponding to the specific user or household. This user has certain rights with respect to automatic skipping of ads. These rights may also be tied to a particular device (PC, DVR, handset, etc.) such that when the content is played on that particular device, ads are automatically skipped regardless of who the user is. In other embodiments, both may be used (a particular user on a specific device) or a family of user (e.g., members of the same household) on a domain of devices (e.g., all the media playback devices registered to that household). As is evident, there are various other arrangements where identifiers 714 may be used depending on the context and needs of the users.

Besides the technology barriers, there may be legal and business roadblocks to automatic ad skipping, such as litigation from content providers and broadcasters. However, embodiments of the present invention allows for legal auto-skipping by enabling the automatic ad-skipping feature only for users who have made some type of payment or consideration and only in programs with ads where the content providers or producers have agreed to such arrangements and business models. Payments from the user may compensate, at least in part, for the lower revenue from advertisers.

As noted above, the media playback unit may have various implementations in addition to the PVR or DVR, such as a computer, including a desktop, laptop, netbook, mini laptop computers or tablet-style computers, and various handset or mobile computing devices that are suitable for viewing media content. FIGS. 8A and 8B illustrate a computing system 800 suitable for implementing specific embodiments of the present invention. FIG. 8A shows one possible physical implementation of the computing system. In one embodiment, computing system 800 includes a monitor 802, a display 804, a housing 806, a disk drive 808, a keyboard 810 and a mouse 812. Disk 814 is a computer-readable medium used to transfer data to and from computer system 800. Other computer-readable media may include USB memory devices and various types of memory chips, sticks, and cards.

FIG. 8B is an example of a block diagram for computing system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 814 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of playing a media file having an ad, the method comprising:
   retrieving a user level value from a user license;
   examining the user level value, wherein the user level value helps indicate a right of a user to not play the ad;
   extracting ad management data from the media file;
   determining a start location of the ad by examining the ad management data;
   retrieving a skip-level value of the ad by examining the ad management data;

comparing the skip-level value with the user level value;
based on the comparison, determining whether the ad should be skipped; and
based on the determination of whether the ad should be skipped,
playing the media file and skipping the ad without involving user intervention.

2. The method as recited in claim 1, wherein the user level value has a plurality of possible values, including a first value that indicates not playing the ad and a second value that indicates playing the ad and wherein the method further comprises determining whether the user level value is equal to the first value or to the second value.

3. The method as recited in claim 1 further comprising: not playing the ad when the skip-level value is less than the user level value.

4. The method as recited in claim 1 wherein the ad management data includes the start location of the ad, an ad control indicator, and the skip-level value.

5. The method as recited in claim 1 wherein the skip-level value is stored with the ad.

6. The method as recited in claim 1 further comprising: filtering a program from a program allocation table; and filtering an ad management stream from the program.

7. The method as recited in claim 6 wherein the ad management stream includes the start location of the ad and an ad control indicator.

8. The A method as recited in claim 6 wherein the media file is in MPEG-2 TS format.

9. The method as recited in claim 1 further comprising:
reading ad control information in the ad management data; and playing the ad according to the ad control information.

10. The method as recited in claim 1 wherein the user level value is associated with a user on a program content basis.

11. The method as recited in claim 1 wherein the user level value is associated with a user on a user subscription basis and indicates a subscription level of the user related to a right to automatically not play ads.

12. The method as recited in claim 1 further comprising:
determining a total ad number from the ad management data table.

13. The method as recited in claim 1 wherein there are a plurality of ads in the media file that are separated by show content and wherein different locations of all the ads are indicated by the ad management data that is stored in the media file.

14. The method as recited in claim 13 wherein each ad is associated with a different skip level indicating that users associated with different user levels would skip different numbers of the ads.

15. The method as recited in claim 1 wherein said ad is referred to herein as the first ad, the media file including a plurality of ads including the first ad and a second ad, the method further comprising:
extracting start points of the first and second ads from the ad management data;
determining a total number of ads in the media file by examining the ad management data;
playing the media file until the start point of the first ad is reached;
reading a skip level of the first ad;
comparing the skip level of the first ad with the user level;
based on the comparing of the skip level of the first ad with the user level, determining whether to skip the first ad;
after the comparing of the skip level of the first ad with the user level, playing the media file until a start point of the second ad is reached;
reading a skip level of the second ad;
comparing the skip level of the second ad with the user level; and
based on the comparing of the skip level of the second ad with the user level, determining whether to skip the first ad.

16. The method as recited in claim 1 wherein the ad management data includes coupon provisioning data that indicates a possibility of granting coupons for watching content.

17. An apparatus for playing a media file, the apparatus comprising: a processor;
a network interface component; a data storage unit storing the media file;
ad management data containing a skip-level value of the ad;
a user license containing a user level value;
an ad evaluation module arranged to compare the skip-level value of the ad with the user level value; and
a media file playback module,
wherein the playback module and the ad evaluation module execute on the processor, such that during playback of the media file,
the ad is automatically not played depending on the comparison between the user level value and the skip level value.

18. The apparatus as recited in claim 17 wherein the data storage unit stores a program allocation table and a program map table.

19. The apparatus as recited in claim 17 wherein the ad management data includes a total number of ads in the media file, a plurality of start locations corresponding to a plurality of ads, and a plurality of end locations corresponding to the plurality of ads.

20. The apparatus as recited in claim 17 wherein the data storage unit stores an ad management data extraction module for obtaining the ad management data from the media content file.

21. The apparatus as recited in claim 17 wherein the ad evaluation module determines when not to play an ad using the user level value.

22. The apparatus as recited in claim 17 wherein the user level value is associated with a user right to automatically not have an ad played during media file playback.

23. The apparatus as recited in claim 17 wherein the media file and the ad management data are received by the apparatus using the network interface component.

24. The apparatus as recited in claim 17 wherein the apparatus is arranged to: extract the ad management data from the media file;
determine a start location of the ad by examining the ad management data; and retrieve a skip level value of the ad by examining the ad management data.

25. The apparatus as recited in claim 17 wherein the ad management data includes coupon provisioning data that indicates a possibility of granting coupons for watching content.

26. A method of automatically not playing ad content during playback of primary content in a media file, the method comprising:
retrieving a user level right from a digital rights management (DRM) license;
extracting ad management data from the media file;
determining a start point of the ad content by examining the ad management data;

playing the primary content until the start point of the ad content;

retrieving a skip-level value of the ad content by examining the ad management data;

comparing the skip-level value with the user level;

determining whether to play the ad content based on said comparing; and if it is determined that the ad content should not be played, playing the media file and skipping the ad content without user action.

27. The method as recited in claim 26 wherein the user level in the DRM license determines whether the ad content is played during playback of the primary content for a specific user or a specific device capable of media file playback.

28. The method as recited in claim 26 wherein determining whether to play the ad content further comprises:

playing the ad content when the skip-level value is equal to or greater than the user level value.

29. The method as recited in claim 26 wherein determining whether to play the ad content further comprises:

not playing the ad content when the skip-level value is equal to or greater than the user level value.

30. An apparatus for playing a media file having an ad, the apparatus comprising:

means for retrieving a user level value from a user license;

means for examining the user level value;

means for extracting ad management data from the media file;

means for determining a start location of the ad by examining the ad management data;

means for retrieving a skip level value of the ad by examining the ad management data;

means for comparing the skip-level value with the user level value;

means skipping the ad and playing the media file depending on the comparison wherein the skipping of the ad is performed without user intervention.

31. The apparatus as recited in claim 30 wherein the user level value has a plurality of possible values, including a first value that indicates not playing the ad and a second value that indicates playing the ad and wherein the method further comprises:

means for determining whether the user level value is equal to the first value or to the second value.

32. The apparatus as recited in claim 30 wherein the ad is not played when the skip-level value is less than the user level value.

33. The apparatus as recited in claim 30 wherein the ad is played when the skip-level value is equal to or greater than the user level value.

34. A non-transitory computer-readable medium storing computer instructions for playing a media file having an ad, the computer-readable medium comprising:

computer code for retrieving a user level value from a user license;

computer code for examining the user level value;

computer code for extracting ad management data from the media file;

computer code for determining a start location of the ad by examining the ad management data;

computer code for retrieving a skip level value of the ad by examining the ad management data;

computer code for comparing the skip level value with the user level value; computer code for determining, based on the comparison, whether the ad should be skipped; and computer code for playing the media file and skipping the ad without involving user intervention based on the determination of whether the ad should be skipped.

35. The non-transitory computer-readable medium as recited in claim 34 wherein the user level value has a plurality of possible values, including a first value that indicates not playing the ad and a second value that indicates playing the ad and wherein the computer-readable medium further comprises computer code for determining whether the user level value is equal to the first value or to the second value.

36. A non-transitory computer-readable medium as recited in claim 34 further comprising:

computer code for determining that the ad should be played when the skip-level value is less than the user level value.

37. The non-transitory computer-readable medium as recited in claim 34 further comprising:

computer code for determining that the ad is played when the skip-level value is equal to or greater than the user level value.

* * * * *